Feb. 10, 1925.
W. M. HUESEMAN
LEG REST
Filed July 5, 1923
1,525,864
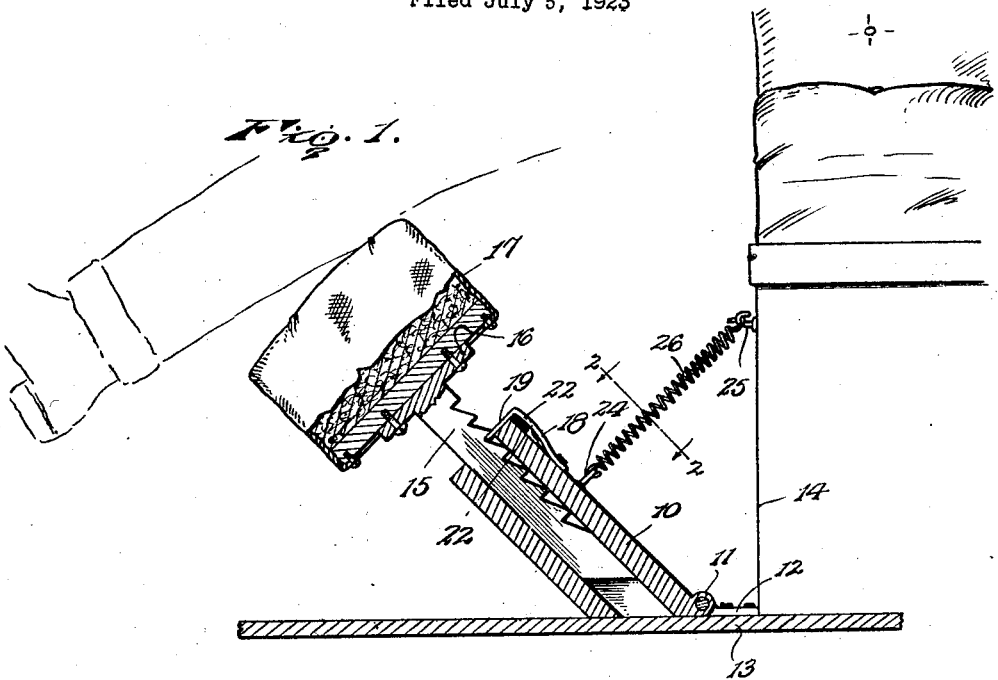
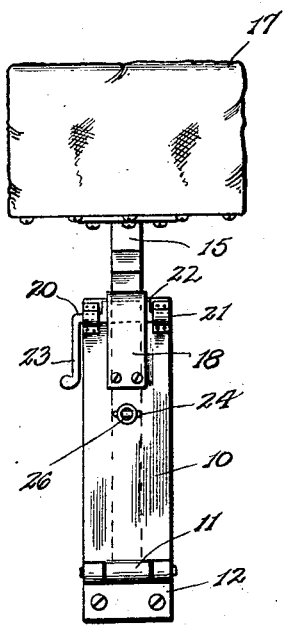
Inventor
W. M. Hueseman.
By
Lacey & Lacey, Attorneys Patented Feb. 10, 1925.

1,525,864

UNITED STATES PATENT OFFICE.

WILLIAM M. HUESEMAN, OF DILLSBORO, INDIANA, ASSIGNOR OF ONE-HALF TO JOHN GOOD, OF AURORA, INDIANA.

LEG REST.

Application filed July 5, 1923. Serial No. 649,770.

*To all whom it may concern:*

Be it known that I, WILLIAM M. HUESEMAN, citizen of the United States, residing at Dillsboro, in the county of Dearborn and State of Indiana, have invented certain new and useful Improvements in Leg Rests, of which the following is a specification.

This invention relates to an improved leg rest for motor vehicles and seeks, among other objects, to provide a device of this character which may be conveniently employed to relieve muscular strain upon the leg of a driver when operating the accelerator of the vehicle.

The invention seeks, as a further object, to provide a device which may be adjusted to suit the requirements or convenience of different drivers.

And the invention seeks, as a still further object, to provide a device which may be readily applied and which, when not in use, will not be in the way.

Other and incidental objects will appear hereinafter.

In the drawings:—

Figure 1 is a fragmentary sectional view showing my improved leg rest applied, and Figure 2 is a detail rear elevation of the device.

In carrying the invention into effect, I employ a preferably squared hollow post 10 provided at its lower end with a hinge lug 11 and mating with said lug is a hinge plate 12 connected to said lug by a suitable pivot pin. In mounting the device, the plate 12 is, as shown in Figure 1 of the drawings, bolted or otherwise secured to the floor boards of the vehicle at the base of the counter of the front seat of the vehicle, said floor boards being conventionally illustrated at 13 and the counter at 14. Slidably fitting in the post 10 is a rack bar 15 provided at its upper end with a head 16 and screwed or otherwise secured to said head is an appropriate cushion 17. Suitably fixed at one end to the rear side of the post is a spring catch 18 having a laterally directed catch member 19 overhanging the upper end of the post to cooperate with the rack bar 15 and journaled upon the post to extend beneath said catch is a shaft 20. Rotatably supporting the shaft are suitable bearings 21 screwed or otherwise secured to the post at opposite sides of the catch and formed on said shaft is a wing or cam member 22 while at one end the shaft is provided with a lever 23. Thus, as will be seen, the lever may be swung for rotating the shaft and moving the cam member 22 against the catch to flex the catch and shift the catch member 19 out of engagement with the teeth of the rack bar 15 so that, as will be seen, the bar may be readily adjusted longitudinally upon the post 10 for varying the elevation of the cushion 17. Extending rearwardly from the post 10 below the catch 18 is an eyelet 24 while upon the counter 14 is mounted a hook 25 and connected at its ends to said eyelet and hook is a spring 26 which will normally function to swing the device upwardly and rearwardly to a position close to the counter out of the way.

In mounting the device upon a vehicle, said device is, of course, disposed at the rear of the accelerator pedal of the vehicle, substantially in alinement therewith, so that, as shown in Figure 1, the device may be rocked forwardly for supporting the right leg of the driver when used to operate the accelerator and, in this connection, it is to be noted that the post 10 is beveled at its lower end to rest flat against the floor boards 23, when the post is rocked forwardly, for rigidly supporting the device in forwardly inclined position. The bar 15 is similarly beveled at its lower end. Since the height of the cushion may, as previously described, be easily varied, it will be seen that the cushion may be positioned to support the leg of the driver in a comfortable position for relieving any muscular strain thereon while, when the driver's leg is removed from the cushion 17, the spring 26 will immediately function to retract the device to substantially upright position. When thus disposed, the cushion may be arranged to support the leg of the driver adjacent the thigh. In Figure 1, the device is shown in its foremost position. However, as will be understood, the device may be arranged at different angles with respect to the seat counter to suit the convenience of the driver.

Having thus described the invention, what is claimed as new is:

1. A leg rest including a hingedly mounted post for attachment to the floor boards of a vehicle, a cushion supporting member carried by the post for sustaining the leg of a driver at a point above the ankle to operate an accelerator pedal, and a spring to extend between the post and an adjacent part of the vehicle for normally swinging the device rearwardly to inactive position.

2. A leg rest including a post for attachment to the floor boards of a vehicle, a rack bar adjustably slidable upon the post, a spring catch upon the post to coact with said bar securing said member in adjusted position for sustaining the leg of a driver to operate an accelerator pedal, and a rotatable shaft mounted upon the post and provided with a cam member to coact with said catch for flexing the catch out of engagement with said rack bar.

3. A leg rest including a post, means for pivotally connecting the post with the floor of a vehicle, a leg engaging member operatively supported by the post for sustaining the leg of a driver at a point above the ankle to operate an accelerator pedal, the post being beveled at its lower end to seat against the floor of the vehicle for limiting the post in its forward swinging movement, and a spring for retracting the post rearwardly, In testimony whereof I affix my signature.

WILLIAM M. HUESEMAN. [L. S.]